United States Patent
Sharma et al.

(10) Patent No.: US 9,977,618 B2
(45) Date of Patent: May 22, 2018

(54) POOLING OF MEMORY RESOURCES ACROSS MULTIPLE NODES

(71) Applicant: INTEL CORPORATION, Santa Clara, CA (US)

(72) Inventors: Debendra Das Sharma, Saratoga, CA (US); Mohan J. Kumar, Aloha, OR (US); Balint Fleischer, Groton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/142,697

(22) Filed: Dec. 27, 2013

(65) Prior Publication Data

US 2015/0186069 A1 Jul. 2, 2015

(51) Int. Cl.
*G06F 12/00* (2006.01)
*G06F 3/06* (2006.01)
*G06F 9/50* (2006.01)

(52) U.S. Cl.
CPC .......... *G06F 3/0644* (2013.01); *G06F 3/061* (2013.01); *G06F 3/0607* (2013.01); *G06F 3/067* (2013.01); *G06F 3/0631* (2013.01); *G06F 3/0679* (2013.01); *G06F 9/5016* (2013.01); *G06F 2209/5011* (2013.01)

(58) Field of Classification Search
CPC .......... G06F 2209/5011; G06F 3/0607; G06F 3/061; G06F 3/0631; G06F 3/0644; G06F 3/067; G06F 3/0679; G06F 9/5016
See application file for complete search history.

(56) References Cited

U.S. PATENT DOCUMENTS

2004/0210736 A1    10/2004  Minnick et al.
2008/0148095 A1*    6/2008  Perdomo ............... G06F 11/141
                                                          714/6.12
2013/0086335 A1*    4/2013  Kitago ................ G06F 12/0215
                                                          711/154

FOREIGN PATENT DOCUMENTS

CN          102150147 A       8/2011

OTHER PUBLICATIONS

Chinese Search Report, CN Application No. 20140857910.1, dated Aug. 18, 2017, 1 page.

* cited by examiner

*Primary Examiner* — Yong Choe
(74) *Attorney, Agent, or Firm* — Barnes & Thornburg LLP (57) ABSTRACT

An apparatus for pooling memory resources across multiple nodes is described herein. The apparatus includes a shared memory controller, wherein each node of the multiple nodes is connected to the shared memory controller. The apparatus also includes a pool of memory connected to the shared memory controller, wherein a portion of the pool of memory is allocated to each node of the multiple nodes.

17 Claims, 4 Drawing Sheets

POOLING OF MEMORY RESOURCES ACROSS MULTIPLE NODES

TECHNICAL FIELD

This disclosure relates generally to memory resources in a multi-node system. More specifically, the disclosure relates pooling the memory resources across multiple nodes.

BACKGROUND ART

A system may include various nodes that each perform a particular function. The system includes, but is not limited to, a network or rack server system, and the like. In some cases, the various nodes can work together to complete a similar task. The nodes may also perform differing tasks with no relation to the tasks performed by other nodes of the system. The system may also include resources, such as compute resources, memory resources, and input/output (I/O) resources. When a process within a node of the network attempts to access a memory service, memory management services of an I/O stack may be accessed to complete the requested memory service.

BRIEF DESCRIPTION OF THE DRAWINGS

The following detailed description may be better understood by referencing the accompanying drawings, which contain specific examples of numerous objects and features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In a multi-node system, a set of resources can be assigned dynamically to various nodes, depending on the demand at each node. As discussed above, memory resources are typically access though an I/O stack, such as Transmission Control Protocol and Internet Protocol (TCP/IP) or InfiniBand (IB). Using an I/O stack to support memory services introduces numerous layers of software interaction. For example, the I/O stack is involved during load operations, store operations, read operations, write operations, request operations. As a result, memory access by a node may suffer from undue latency and bottlenecks resulting from the use of the I/O stack. Even when a system includes a memory server, the I/O stack still requires dedicated memory at each node in order to access the memory server.

Embodiments described herein relate to pooling memory resources across multiple nodes. In embodiments, each node of a multi-node system connects to one or more shared memory controllers (SMC). Each node connects to one or more SMCs. Each SMC is connected to a pool of memory which can be a combination of dynamic random access memory (DRAM), solid state drive (SSD), or any other non-volatile memory (NVM) or storage technology. The SMC provides load and store based flat memory access using both volatile and non-volatile memory, as well as a block mode memory access to each node. Each node accesses the portion of the memory pool allocated to the particular node. In some embodiments, each node of a multi-node system is coupled with one or more SMCs, which in turn are coupled with a pool of memory.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM), random access memory (RAM), magnetic disk storage media, optical storage media, flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
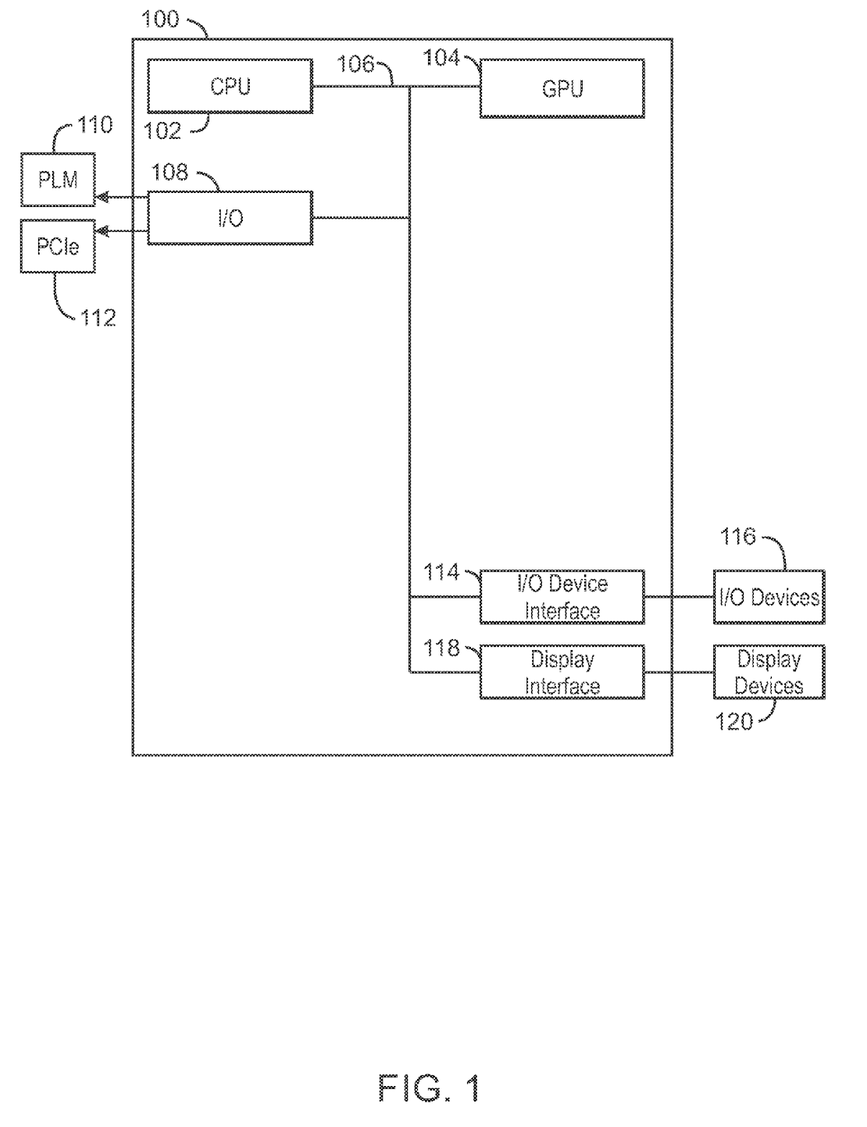
FIG. 1 is a block diagram of a node 100 that may access pooled memory resources.

FIG. 1 is a block diagram of a node 100 that may access pooled memory resources. The node 100 may be, for example, a laptop computer, desktop computer, tablet computer, mobile device, server, or blade server, among others. In some examples, a node is any device that is capable of communicating across the multi-node system to another node. Accordingly, in some examples, the multi-node system is a network of nodes, where each node is any device capable of communicating across the network. Additionally, in some examples, the multi-node is a server in a rack server system.

The node 100 may include a central processing unit (CPU) 102 that is configured to execute stored instructions. The CPU 102 can be a single core processor, a multi-core processor, a computing cluster, or any number of other configurations. In some cases, the CPU 102 and other components of the node 100 may be implemented as a system on chip (SOC). Furthermore, the node 100 may include more than one CPU 102. The instructions that are executed by the CPU 102 may be used to enable the pooling of memory resources across multiple nodes.

The node 100 may also include a graphics processing unit (GPU) 104. As shown, the CPU 102 may be connected through a bus 106 to the GPU 104. However, in some embodiments, the CPU 102 and the GPU 104 are located on the same . The GPU 104 may be configured to perform any number of graphics operations within the node 100. For example, the GPU 104 may be configured to render or manipulate graphics images, graphics frames, videos, or the like, to be displayed to a user of the node 100. In some cases, however, the node 100 does not include a GPU 104.

The CPU 102 may also be connected through the bus 106 to a CPU input/output (I/O). In embodiments, the CPU I/O 108 is used such that the CPU 102 can access pooled memory in a multi-node system. The CPU 102 can access the pooled memory without including dedicated memory within the node 100. Further, the CPU I/O 108 can access pooled memory within the multi-node system without the use of communication and networking protocols such as Transmission Control Protocol and Internet Protocol (TCP/IP) and InfiniBand (IB). In embodiments, a link such as a Plattsmouth (PLM) Link 110 is used to connect each node to a shared memory controller using memory semantics based protocols running on a serial link. A Peripheral Component Interconnect Express (PCIe) Link 112 may be used to connect the CPU 102 to a network.

The CPU 102 may also be connected through the bus 106 to an input/output (I/O) device interface 114 configured to connect the node 100 to one or more I/O devices 116. The I/O devices 116 may include, for example, a keyboard and a pointing device, wherein the pointing device may include a touchpad or a touchscreen, among others. The I/O devices 116 may be built-in components of the node 100, or may be devices that are externally connected to the node 100. The CPU 102 may also be linked through the bus 106 to a display interface 118 configured to connect the node 100 to a display device 120. The display device 120 may include a display screen that is a built-in component of the node 100. The display device 120 may also include a computer monitor, television, or projector, among others, that is externally connected to the node 100.

The block diagram of FIG. 1 is not intended to indicate that the node 100 is to include all of the components shown in FIG. 1. Further, the node 100 may include any number of additional components not shown in FIG. 1, depending on the details of the specific implementation. Moreover, the node 100 may include fewer components than those illustrated in FIG. 1. For example, the node 100 may not include a GPU 104, I/O device interface 114, or display interface 118.

Figure 2:
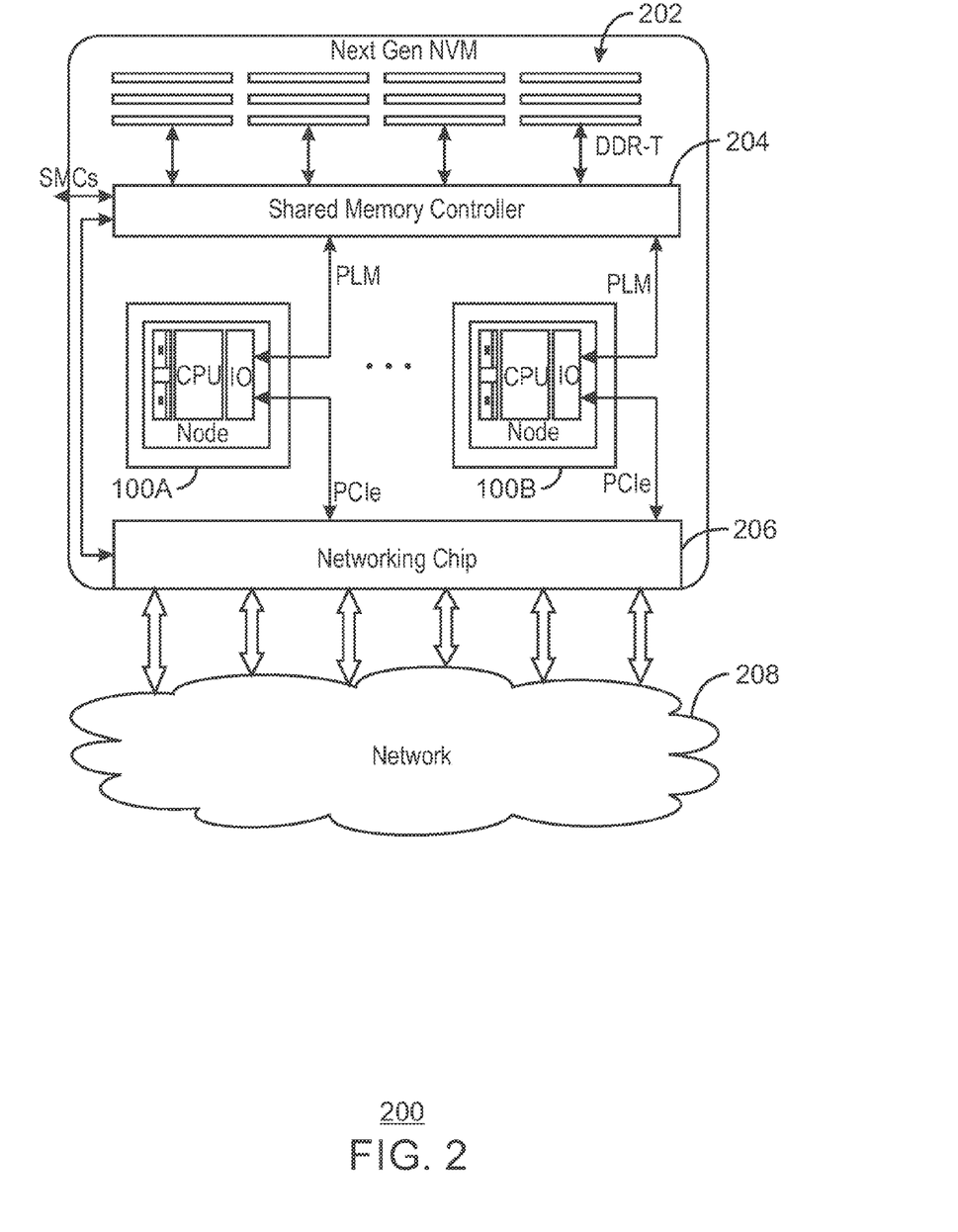
FIG. 2 is an illustration of a multi-node system with access to pooled/disaggregated memory through one or more Shared Memory Controllers (SMC)

FIG. 2 is an illustration of a multi-node system 200. The multi-node system may include a pooled memory 202. The pooled memory 202 can include any type of memory or storage technology, such as random access memory (RAM), read only memory (ROM), flash memory, or any other suitable memory systems. For example, the pooled memory 202 may include dynamic random access memory (DRAM). The pooled memory 202 may also be physical memory such as a hard drive, an optical drive, a thumbdrive, an array of drives, or any combinations thereof. In some embodiments, the pooled memory includes dual in-line memory modules (DIMMs). In some cases, these DIMMs may be the next generation NVM based DIMMs, which enables a large memory capacity and both persistent as well as volatile memory characteristics. Additionally, in embodiments, a DIMM may be replaced by some other form-factor that is a collection of one or more memory or storage devices. The pooled memory 202 concept may be applicable for various server (e.g., cloud computing, enterprise), High-performance computing, and client usages. The pooled memory may be accessed through an SMC 204. Although one SMC 204 is illustrated, the system 200 may have any number of SMCs. The SMC 204 may host multiple DIMMS. The SMC 204 can support double data rate (DDR) buses, transactional DDR (DDR-T) buses, and other links/buses that enable connections with various memories that can be included in the memory pool 202, including DRAM and non-volatile DIMM (NVDIMM). The pooled memory can also support a different memory hierarchy such as the two level memory (2LM) by hosting the "Far Memory", assuming memory side caching capability included in the processors' integrated memory controller (iMC) on each node.

A node 100A and a node 100B is also included in the system. Even though the system 200 illustrates two nodes connected to one SMC, any number of nodes may be directly connected to multiple SMCs. The nodes 100A and 100B may connect to the SMC 204 to access the pooled memory 202. A Plattsmouth (PLM) Link is used to connect each node to an SMC. The PLM is capable of supporting both memory semantics with optional directory information present in existing memory protocols from Intel such as SMI3 and/or an I/O protocol with load and store functionality, such as a Peripheral Component Interconnect Express (PCIe) protocol. In embodiments, any link that can support memory semantics and an I/O protocol using a common set of pins can be used to connect a node to an SMC. In embodiments, the PLM may be implemented using the physical layer of the PCIe architecture. In addition to the I/O functionality enabled by the PCIe architecture, direct memory semantics are enabled using common PCIe pins. The memory semantics enable each node to communicate with the pool of memory as if it were directly connected to the pool of memory. For example, the PLM may send directory information, memory address locations, and block memory locations on a common set of PCIe pins. In this manner, the node can use a standard link to gain access to any type of memory connected to the SMC. The node can be updated or replaced without any re-validation of the pooled memory, as the connection between the node and the memory pool remains constant. Additionally, memory upgrade cycles can be independent of CPU upgrade cycles. For example, the memory pool can be replaced after several CPU upgrades, providing significant cost savings to the customer.

In embodiments, multiple SMCs may be connected to each other through PLM links. Multiple SMCs may also be connected to each other through a traditional networking stack such as Ethernet, Infiniband, StormLake, and the like, as long as the networking hardware is capable of delivering the data packets or flits to the destination SMCs. Specifically, the traditional networking hardware may use independent virtual lanes to enable Quality of Service for the PLM protocol. In any event, the one or more SMCs enable direct memory access through hardware with no software induced latency.

Additionally, the SMC 204 and the nodes 100A and 100B may connect to a network connectivity block 206. In some embodiments, the network connectivity block is a network interface controller (NIC) may be configured to connect the nodes 100A and 100B and each of the SMC 204 to a network 208. The network 208 can be a wire line network, a wireless network, or a cellular network. The network 208 may be any wide area network (WAN), any local area network (LAN), or the Internet, among others. For example, network 208 can be 3GPP LTE network or a WiFi network. Accordingly, the nodes 100A and node 100B are not restricted to one type of connection. Rather, the nodes can link to various resources using multiple links. In some cases, access to the network 208 provides access to additional memory devices and storage drives, and the SMC 204 may use the network 208 to allocate the additional memory devices and storage drives.

Figure 3:
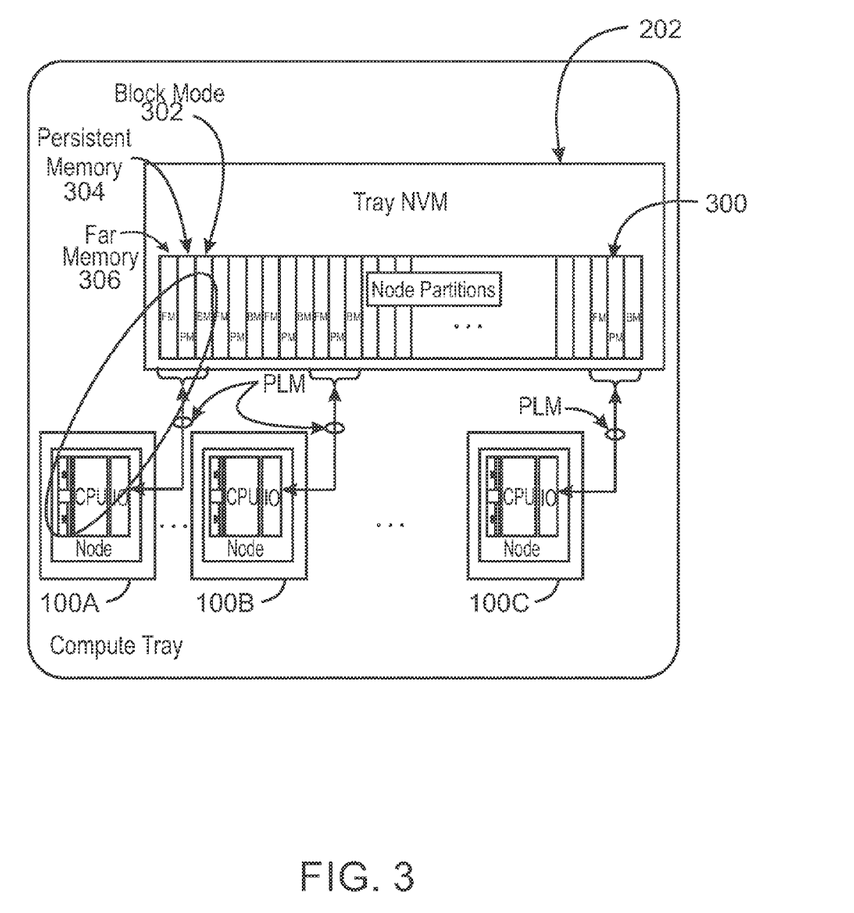
FIG. 3 is an illustration of disaggregated memory allocated to each node for various usages.

FIG. 3 is an illustration of the disaggregated/ pooled memory allocated to various nodes. A memory 202 may be coupled to an SMC. Each of the nodes 100A, 100B, and 100C use the SMC to access the pooled memory 202. In FIG. 3, the pooled memory is illustrated as being a tray of non-volatile memory (NVM), such as tray NVM included in rack server systems. The tray NVM includes an illustration of a disaggregated memory 300.

The pooled 202 memory may include standard volatile DRAM DIMMs or non-volatile DIMMs (NVDIMMs). When using NVDIMMs to build the pool of memory, the memory can function as a storage device. Accordingly, the pool of memory can be access using blocks of memory as is a typical storage device, rather than flat memory access using linear access to bytes of data. In some embodiments, the disaggregated memory 300 is partitioned into three types of memory: a far memory (FM) 306, a persistent memory (PM) 304, and a block memory (BM) 302. The FM represents the traditional volatile memory, where the memory contents belonging to a node are wiped out after the node is reset due to events such as power removal, system management induced reset, etc. The PM is accessed as regular memory directly by the CPU using the traditional memory Load/Store model. However, the memory contents are preserved across resets/power cycle. Each of the FM 306, and PM 304, may be enabled through a memory side caching based architecture. The pool of memory 202 may be divided into FM 306, PM 304, and BM 302 in a variable fashion. The BM 302 is memory that is similar to memory contained within a storage device. The BM 302 is accessed through operations that use blocks of memory by accessing a software driver in the node.

The SMC manages the division of memory between FM 306, PM 304, and BM 302. The SMC also manages the allocation of memory to each node. Accordingly, each of the nodes 100A, 100B, and 100C is allocated a portion of the disaggregated memory 300. The SMC may include registers that enforces the memory divisions, which can be mapped to a memory region of each node. The memory region of each node can be an I/O or memory mapped I/O (MMIO) accessible region in the case of a block memory. Also, in some cases, the amount of memory allocated for each node can be changed by a tray/rack management stack. Moreover, in some cases, the memory connected to a first SMC may also be assigned to a node that is not directly connected to the first SMC. If memory in a first, remote SMC is mapped to a node, a second, local SMC that connects directly to the node maintains the address information on behalf of the first, remote SMC to route the accesses appropriately.

In embodiments, each of the nodes is assigned one or multiple virtual DIMMs (VDIMMs) based on the number of node partitions the node receives. The VDIMM may be a partial DIMM, or the VDIMM can span multiple physical DIMMs (full and/or partial). Node identifications (IDs) may be assigned to each VDIMM by the one or more SMCs so that they can disambiguate requests/responses to independent nodes. It should be noted that the same Node IDs will be maintained throughout the SMC/inter-SMC Links to identify the SMC and the node within that SMC where the request came from and/or response that needs to be delivered to. Through the VDIMM, the nodes remain oblivious of the other nodes that may share the physical memory and storage devices that form the VDIMM. The node can perform any operation at the VDIMM level, such as reset, hot-add and hot-remove. The one or more SMCs are aware of the VDIMMs allotted to each node, and each SMC manages the commands it receives for the VDIMMs. The SMCs maintain the node ID along with the address or VDIMM number so that the SMC can to disambiguate between memory accesses from different nodes.

Although the node partitions are illustrated as being contiguous areas of memory, the node partitions may not be contiguous within the pool of memory. Moreover, although the node partitions are illustrated as belonging to one tray of NVM that is controlled by an SMC, the node partitions 300 may represent memory aggregated from multiple SMCs that can access one or more locations that include any type of memory or storage device. For example, the node partitions may also include memory accessed across a networking chip.

Figure 4:
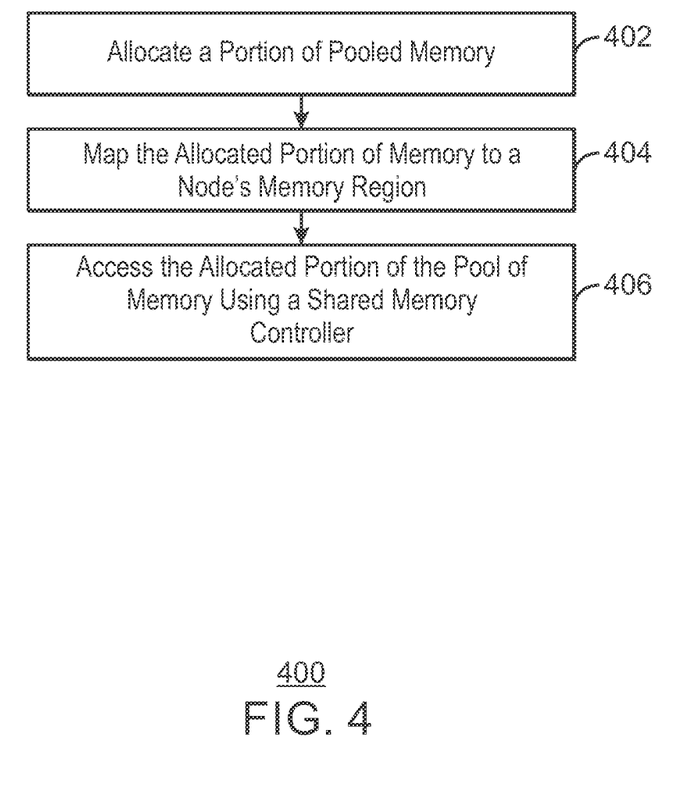
FIG. 4 is a process flow diagram for pooling memory resources across multiple nodes.

FIG. 4 is a process flow diagram for pooling memory resources across multiple nodes. At block 402, a pool of memory is allocated by the rack/tray controller to a set of nodes either connected directly to the SMC or connected through a remote SMC. It should be noted that block 402 may assign memory across multiple SMCs. In some cases, the pool of memory is divided into far memory, persistent memory, and block memory. At block 404, the allocated pool of memory is mapped to each node's memory region. When a node's system software (such as BIOS/OS/VMM) requests memory (FM, PM, and/or BM), the rack/tray controller then allocates the requested memory from the memory pool as described in block 402. In the process, the node provides its address map information for the memory it requests and the rack/tray controller sets up the SMC(s) with the appropriate address map information from the node's perspective. Each SMC also stores information regarding how each node maps to the overall pooled memory address space. At block 406, each node can directly access its allocated portion of the pool of memory using a shared memory controller without additional software overhead. The pooling of memory enables data to be shared between nodes, without message passing and data copying. Additionally, the present techniques may be able to use memory more efficient since it is pooled and physical memory and storage devices may be shared between multiple nodes, with each node unaware that the physical memory and storage device is shared, as each node can access no more than the memory that is allocated to it. This is a cost-effective allocation of memory that enables fractional DIMM assignment to nodes, which is useful as memory capacity increases. The pooling of memory also enables a higher compute density, as the memory used for computation is disaggregated from other memory. In this manner, more memory may be free for use by compute nodes in the multi-node system.

In some cases, the SMC may enable flexible memory allocation based on demand from the nodes. In such a scenario, the memory allocation may change based on a workload processed by each node. The memory allocations can be assigned to a node through a memory map. Further, in some cases, memory pooling enables greater power efficiency when compared to systems without memory pooling, as each node is not over provisioned with the maximum memory capacity it may need.

Additionally, in some cases a memory server may be used for pooling memory. In such a scenario, one node may include spare memory that it provides to other nodes based on their demand. The spare memory may be provided according to an operating system or virtual machine demand. Memory clustering may also be available through an in-memory data grid. Further, replication services for persistent memory or storage within or across trays can be enabled through the present techniques. In our usage NVM can be used both as volatile main memory (FM) and non volatile memory, both as memory mapped (PM) as well as a block-mapped I/O device (BM). As a result, the NVM can be mapped as a memory as opposed to being mapped as an I/O device, which has performance implications. Mapping the NVM as an NVM while using the NVM as a storage device enables replication services than may not be present with traditional storage devices.

EXAMPLE 1

An apparatus for pooling memory resources across multiple nodes is described herein. The apparatus includes a shared memory controller and a pool of memory. Each node of the multiple nodes is connected to the shared memory controller. The pool of memory connected to the shared memory controller, wherein a portion of the pool of memory is allocated to each node of the multiple nodes.

The apparatus may include a plurality of shared memory controllers, and each node of the multiple nodes may be connected to one or more of the plurality of shared memory controllers. The shared memory controller may be connected through a Plattsmouth Link, a link that supports both memory semantics and an I/O protocol using a common set of pins, a networking stack, or any combination thereof. Additionally, a Plattsmouth Link may be used to connect each node to the shared memory controller. A link that supports both memory semantics and an I/O protocol using a common set of pins may be used to connect each node to the shared memory controller. The pool of memory may include dynamic random access memory (DRAM), solid state drive (SSD), or any other non-volatile memory (NVM) or storage technology, or any combination thereof. The shared memory controller may provide load and store based flat memory access. Further, the shared memory controller may provide block mode access to each node its portion of memory, and the pool of memory may include next generation NVM based DIMMs with a large capacity.

EXAMPLE 2

A system is described herein. The system includes a blade server with one or more nodes and a shared memory controller. The shared memory controller is coupled with a plurality of nodes and a pool of memory, and the shared memory controller manages memory services between the pool of memory and the plurality of nodes such that the plurality of nodes can access the pool of memory without using I/O functionality.

The system may include a plurality of shared memory controllers, wherein each node of the plurality of nodes is connected to one or more of the plurality of shared memory controllers. Each shared memory controller may be coupled with other shared memory controllers through a Plattsmouth Link, a link that supports both memory semantics and an I/O protocol using a common set of pins, a networking stack, or any combination thereof. Further, a Plattsmouth Link may be used to connect each node to the shared memory controller. A link that supports both memory semantics and an I/O protocol using a common set of pins may be used to connect each node to the shared memory controller. The pool of memory may include a dynamic random access memory (DRAM), solid state drive (SSD), or any other non-volatile memory (NVM) or storage technology, or any combination thereof. The pool of memory may also include cloud based memory devices and storage drives.

EXAMPLE 3

A method of pooling memory resources across multiple nodes is described herein. The method includes allocating a portion of pooled memory into a type of memory. The method also includes mapping the allocated portion of the pool of memory to each node's memory region. Further, the method includes accessing the allocated portion of the pool of memory for each node using a shared memory controller.

A shared memory controller may include registers and enforce the allocation of the pool of memory. The memory of a shared memory controller may be assigned to a node that is not directly connected to the shared memory controller. Additionally, the virtual DIMM (VDIMM) may be a partial DIMM. Further, the VDIMM may spans multiple physical DIMMs, memory devices, or storage drives.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus for pooling memory resources across multiple nodes, comprising:
   a plurality of shared memory controllers, wherein each node of the multiple nodes is connected to one or more of the plurality of shared memory controllers, and wherein each shared memory controller is connected through a Plattsmouth Link, a link that supports both memory semantics and an input/output (I/O) protocol using a common set of pins, a networking stack, or any combination thereof; and
   a pool of memory connected to a shared memory controller, the pool of memory comprising a far memory, a persistent memory, and a block memory, wherein a portion of the pool of memory is allocated to each node of the multiple nodes.

2. The apparatus of claim 1, wherein a Plattsmouth Link is used to connect each node to the shared memory controller.

3. The apparatus of claim 1, wherein a link that supports both memory semantics and an I/O protocol using a common set of pins is used to connect each node to the shared memory controller.

4. The apparatus of claim 1, wherein the pool of memory includes dynamic random access memory (DRAM), solid state drive (SSD), or any other non-volatile memory (NVM) or storage technology, or any combination thereof.

5. The apparatus of claim 1, wherein the shared memory controller provides load and store based flat memory access.

6. The apparatus of claim 1, wherein the shared memory controller provides block mode access to each node its portion of memory.

7. The apparatus of claim 1, wherein the pool of memory includes next generation NVM based DIMMs with a large capacity.

8. A system, comprising:
   a blade server with one or more nodes;
   a plurality of shared memory controllers, wherein a shared memory controller is coupled with a plurality of nodes and a pool of memory, and each node of the plurality of nodes is connected to one or more of the plurality of shared memory controllers and each shared memory controller is coupled with other shared memory controllers through a Plattsmouth Link, a link that supports both memory semantics and an input/output (I/O) protocol using a common set of pins, a networking stack, or any combination thereof, and the shared memory controller manages memory services between the pool of memory and the plurality of nodes such that the plurality of nodes can access the pool of memory without using I/O functionality, and wherein the pool of memory comprises a far memory, a persistent memory, and a block memory.

9. The system of claim 8, wherein a Plattsmouth Link is used to connect each node to the shared memory controller.

10. The system of claim 8, wherein a link that supports both memory semantics and an I/O protocol using a common set of pins is used to connect each node to the shared memory controller.

11. The system of claim 8, wherein the pool of memory includes dynamic random access memory (DRAM), solid state drive (SSD), or any other non-volatile memory (NVM) or storage technology, or any combination thereof.

12. The system of claim 8, wherein the pool of memory includes cloud based memory devices and storage drives.

13. A method of pooling memory resources across multiple nodes, the method comprising:

allocating a portion of pooled memory into a type of memory, wherein the pool of memory comprises a far memory, a persistent memory, and a block memory;

mapping the allocated portion of the pool of memory to each node's memory region; and accessing the allocated portion of the pool of memory for each node using a shared memory controller, wherein each shared memory controller of a plurality of shared memory controllers is connected through a Plattsmouth Link, a link that supports both memory semantics and an I/O protocol using a common set of pins, a networking stack, or any combination thereof.

14. The method of claim 13, wherein a shared memory controller includes registers and enforces the allocation of the pool of memory.

15. The method of claim 13, wherein the memory of a shared memory controller is assigned to a node that is not directly connected to the shared memory controller.

16. The method of claim 13, wherein a virtual DIMM (VDIMM) assigned to a node of the multiple nodes is a partial DIMM.

17. The method of claim 16, wherein the VDIMM spans multiple physical DIMMs, memory devices, or storage drives.

* * * * *